(12) United States Patent
Strömberg et al.

(10) Patent No.: US 11,030,837 B2
(45) Date of Patent: Jun. 8, 2021

(54) PROVIDING ACCESS TO A LOCK BY SERVICE CONSUMER DEVICE

(71) Applicant: ASSA ABLOY AB, Stockholm (SE)

(72) Inventors: Stefan Strömberg, Stockholm (SE); Kenneth Pernyer, Stockholm (SE); Sona Singh, Täby (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 16/466,208

(22) PCT Filed: Dec. 6, 2017

(86) PCT No.: PCT/EP2017/081676
§ 371 (c)(1),
(2) Date: Jun. 3, 2019

(87) PCT Pub. No.: WO2018/104384
PCT Pub. Date: Jun. 14, 2018

(65) Prior Publication Data
US 2020/0184752 A1   Jun. 11, 2020

(30) Foreign Application Priority Data
Dec. 6, 2016  (EP) .................................... 16202455

(51) Int. Cl.
*G05B 19/00* (2006.01)
*G07C 9/00* (2020.01)
*H04L 9/30* (2006.01)

(52) U.S. Cl.
CPC ..... *G07C 9/00571* (2013.01); *G07C 9/00817* (2013.01); *G07C 9/00857* (2013.01); *G07C 9/00896* (2013.01); *H04L 9/30* (2013.01)

(58) Field of Classification Search
CPC ............ G07C 9/00571; G07C 9/00817; G07C 9/00857; G07C 9/00896; H04L 9/30
(Continued)

(56) References Cited

U.S. PATENT DOCUMENTS

| 4,837,822 A | * | 6/1989 | Crosley | G07C 9/27 713/185 |
| 5,941,107 A | * | 8/1999 | Hsu | E05B 35/08 70/278.3 |

(Continued)

FOREIGN PATENT DOCUMENTS

DE          10147936          4/2003

OTHER PUBLICATIONS

International Search Report and Written Opinion for International (PCT) Patent Application No. PCT/EP2017/081676, dated Feb. 20, 2018, 16 pages.
(Continued)

*Primary Examiner* — Kerri L McNally
*Assistant Examiner* — Thang D Tran
(74) *Attorney, Agent, or Firm* — Sheridan Ross P.C.

(57) ABSTRACT

It is presented a method for providing access to a lock for provision of a service. The method comprises the steps of: receiving a request for access to the lock, the request being based on the service consumer ordering a service requiring access to a physical space, the request comprising a first public key associated with a co-ordinator and a second public key associated with a service provider agent; presenting a first consumer query to the service consumer; receiving a first positive consumer response indicating that the service consumer allows the service provider agent to access the physical space; and delegating access to the lock to the co-ordinator, which comprises encrypting at least part of a delegation using the first public key, encrypting at least part of the delegation using the second public key, and electronically signing the delegation, enabling further delegation to the service provider agent.

9 Claims, 4 Drawing Sheets

(58) Field of Classification Search
USPC .......................................................... 340/5.8
See application file for complete search history.

(56) References Cited

U.S. PATENT DOCUMENTS

| | | | | |
|---|---|---|---|---|
| 6,986,044 | B1* | 1/2006 | Inada | H04L 9/0822 380/282 |
| 7,624,280 | B2* | 11/2009 | Oskari | G06F 21/35 713/169 |
| 10,097,353 | B1* | 10/2018 | Carlson | H04W 12/0608 |
| 10,521,984 | B1* | 12/2019 | Johansson | H04L 63/108 |
| 2002/0099945 | A1* | 7/2002 | McLintock | G07C 9/27 713/186 |
| 2002/0180582 | A1* | 12/2002 | Nielsen | G07C 9/00571 340/5.6 |
| 2004/0003257 | A1* | 1/2004 | Mitchell | G07C 9/00571 713/182 |
| 2008/0111659 | A1* | 5/2008 | Pesapane | G07C 9/00571 340/5.6 |
| 2009/0051486 | A1* | 2/2009 | Denison | G07C 9/00571 340/5.25 |
| 2010/0141381 | A1 | 6/2010 | Bliding et al. | |
| 2010/0321150 | A1* | 12/2010 | Lee | G07C 9/28 340/5.7 |
| 2011/0035604 | A1* | 2/2011 | Habraken | G06F 21/34 713/193 |
| 2011/0047378 | A1* | 2/2011 | Chen | H04L 9/3226 713/168 |
| 2011/0099549 | A1* | 4/2011 | Sriraghavan | G06Q 10/101 718/100 |
| 2011/0215921 | A1* | 9/2011 | Ben Ayed | H04B 7/00 340/539.11 |
| 2012/0008771 | A1* | 1/2012 | Lu | G06F 21/805 380/46 |
| 2012/0280783 | A1* | 11/2012 | Gerhardt | G07C 9/00309 340/5.6 |
| 2013/0027177 | A1* | 1/2013 | Denison | G07F 5/26 340/5.23 |
| 2013/0179681 | A1* | 7/2013 | Benson | H04L 9/3234 713/155 |
| 2014/0040622 | A1* | 2/2014 | Kendall | G06F 21/56 713/171 |
| 2014/0361866 | A1* | 12/2014 | Evans | H04L 63/102 340/4.32 |
| 2015/0084750 | A1* | 3/2015 | Fitzgibbon | G01S 5/14 340/12.29 |
| 2015/0106616 | A1* | 4/2015 | Nix | H04L 9/3247 713/156 |
| 2015/0109098 | A1* | 4/2015 | Singh | G07C 9/27 340/5.6 |
| 2015/0119019 | A1* | 4/2015 | Minichmayr | H04W 12/04 455/420 |
| 2015/0207766 | A1* | 7/2015 | Lindner | H04L 51/04 709/206 |
| 2015/0371468 | A1 | 12/2015 | Mackin et al. | |
| 2016/0086175 | A1* | 3/2016 | Finlow-Bates | H04L 9/3271 705/77 |
| 2016/0086400 | A1* | 3/2016 | Dumas | G07C 9/00571 340/5.61 |
| 2016/0269168 | A1* | 9/2016 | Carstens | H04W 56/001 |
| 2016/0292938 | A1* | 10/2016 | Zakaria | G07C 9/00571 |
| 2016/0358397 | A1* | 12/2016 | Kristensen | G07C 9/00309 |
| 2017/0011570 | A1* | 1/2017 | Johnson | G07C 9/00 |
| 2017/0243424 | A1* | 8/2017 | Shirai | G07C 9/00309 |
| 2017/0337755 | A1* | 11/2017 | Biehl | H04W 24/08 |
| 2017/0345237 | A1* | 11/2017 | Kuenzi | H04L 63/0428 |
| 2017/0359193 | A1* | 12/2017 | Smith | H04L 12/2823 |
| 2017/0372600 | A1* | 12/2017 | Palin | G06F 3/0484 |
| 2018/0137704 | A1* | 5/2018 | Catering | H04W 4/80 |
| 2018/0159835 | A1* | 6/2018 | Iida | G07C 9/00571 |

OTHER PUBLICATIONS

International Preliminary Report on Patentability for International (PCT) Patent Application No. PCT/EP2017/081676, dated Feb. 26, 2019, 19 pages.

* cited by examiner

US 11,030,837 B2

PROVIDING ACCESS TO A LOCK BY SERVICE CONSUMER DEVICE

CROSS REFERENCE TO RELATED APPLICATIONS

This application is a national stage application under 35 U.S.C. 371 and claims the benefit of PCT Application No. PCT/EP2017/081676 having an international filing date of 6 Dec. 2017, which designated the United States, which PCT application claimed the benefit of European Patent Application No. 16202455.8 filed 6 Dec. 2016, the disclosure of each of which are incorporated herein by reference.

TECHNICAL FIELD

The invention relates to a method, service consumer device, computer program and computer program product for providing access to a lock for a service provider.

BACKGROUND

Locks and keys are evolving from the traditional pure mechanical locks. These days, electronic locks are becoming increasingly common. For electronic locks, no mechanical key profile is needed for authentication of a user. The electronic locks can e.g. be opened using an electronic key stored on a special carrier (fob, card, etc.) or in a smartphone. The electronic key and electronic lock can e.g. communicate over a wireless interface. Such electronic locks provide a number of benefits, including improved flexibility in management of access rights, audit trails, key management, etc.

When an owner or user of such an electronic lock consumes a service, that person is here denoted a service consumer. The service can be any service where the person performing the service needs the electronic lock to be opened. For instance, the service can be a delivery of a product, a cleaning service, a builder/plumber/electrician, etc. To be able to consume the service, the service consumer thus needs to provide access to a service provider using the electronic lock.

US 2015/0371468 A1 presents a storage container for storing postal items, the container comprising: a container with a door, a locking means for locking the door shut, code input means for inputting a code to unlock the locking means, weighing means for measuring the weight of contents of the container, and communication means for communicating the measured weight of the contents when the door is locked shut, wherein a code for unlocking the locking means varies over time. The presented storage container is limited to providing access for deliveries. Such a solution is not suitable for general service access.

SUMMARY

It is an object to provide a solution for providing access to a lock which is applicable for all types of services.

According to a first aspect, it is presented a method for providing access to a lock for provision of a service, the lock being associated with a service consumer. The method is performed in a service consumer device and comprises the steps of: receiving a request for access to the lock, the request being based on the service consumer ordering a service requiring access to a physical space which is secured by the lock, the request comprising a first public key associated with a co-ordinator and a second public key associated with a service provider agent; presenting a first consumer query to the service consumer, asking whether to grant access to the lock for the service provider agent to provide the service; receiving a first positive consumer response indicating that the service consumer allows the service provider agent to access the physical space secured by the lock; and delegating access to the lock to the co-ordinator, which comprises encrypting at least part of a delegation using the first public key, encrypting at least part of the delegation using the second public key, and electronically signing the delegation, enabling further delegation, of access of the lock, to the service provider agent.

The step of delegating access may comprise delegating access for a scheduled time only.

The method may further comprise the step of: presenting a second consumer query to the service consumer, asking whether to grant access to the lock for the service provider agent to provide the service; and receiving a second positive response, indicating that the service consumer allows the service provider agent to access the physical space secured by the lock. In such a case, the step of delegating access only performed when the second positive response has been received.

When there is an absence of response to the second consumer request, the step of delegating access may still be performed.

When there is an absence of response to the second consumer request, the step of delegating access may be prevented from being performed.

In one embodiment, the step of sending a second consumer request is only performed at a configured time prior to when access to a lock for the service provider agent is needed.

In one embodiment, the step of sending a second consumer request is only performed when a signal is received indicating that the service provider agent is within a configured distance from the lock.

For recurring services by the service provider agent, the method may be repeated except for the steps of presenting a first consumer query and receiving a first positive consumer response.

According to a second aspect, it is presented a service consumer device for providing access to a lock for provision of a service, the lock being associated with a service consumer. The service consumer device comprises: a processor; and a memory storing instructions that, when executed by the processor, cause the service consumer device to: receive a request for access to the lock, the request being based on the service consumer ordering a service requiring access to a physical space which is secured by the lock, the request comprising a first public key associated with a co-ordinator and a second public key associated with a service provider agent; present a first consumer query to the service consumer, asking whether to grant access to the lock for the service provider agent to provide the service; receive a first positive consumer response indicating that the service consumer allows the service provider agent to access the physical space secured by the lock; and delegate access to the lock to the co-ordinator, which comprises encrypting at least part of a delegation using the first public key, encrypting at least part of the delegation using the second public key, and electronically signing the delegation, enabling further delegation, of access of the lock, to the service provider agent.

The instructions to delegate access may comprise instructions that, when executed by the processor, cause the service consumer device to delegate access for a scheduled time only.

The service consumer device may further comprise instructions that, when executed by the processor, cause the service consumer device to: present a second consumer query to the service consumer, asking whether to grant access to the lock for the service provider agent to provide the service; receive a second positive response, indicating that the service consumer allows the service provider agent to access the physical space secured by the lock; and only execute the instructions to delegate access when the second positive response has been received.

According to a third aspect, it is presented a computer program for providing access to a lock for provision of a service, the lock being associated with a service consumer. The computer program comprises computer program code which, when run on a service consumer device causes the service consumer device to: receive a request for access to the lock, the request being based on the service consumer ordering a service requiring access to a physical space which is secured by the lock, the request comprising a first public key associated with a co-ordinator and a second public key associated with a service provider agent; present a first consumer query to the service consumer, asking whether to grant access to the lock for the service provider agent to provide the service; receive a first positive consumer response indicating that the service consumer allows the service provider agent to access the physical space secured by the lock; and delegate access to the lock to the co-ordinator, which comprises encrypting at least part of a delegation using the first public key, encrypting at least part of the delegation using the second public key, and electronically signing the delegation, enabling further delegation, of access of the lock, to the service provider agent.

According to a fourth aspect, it is presented a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
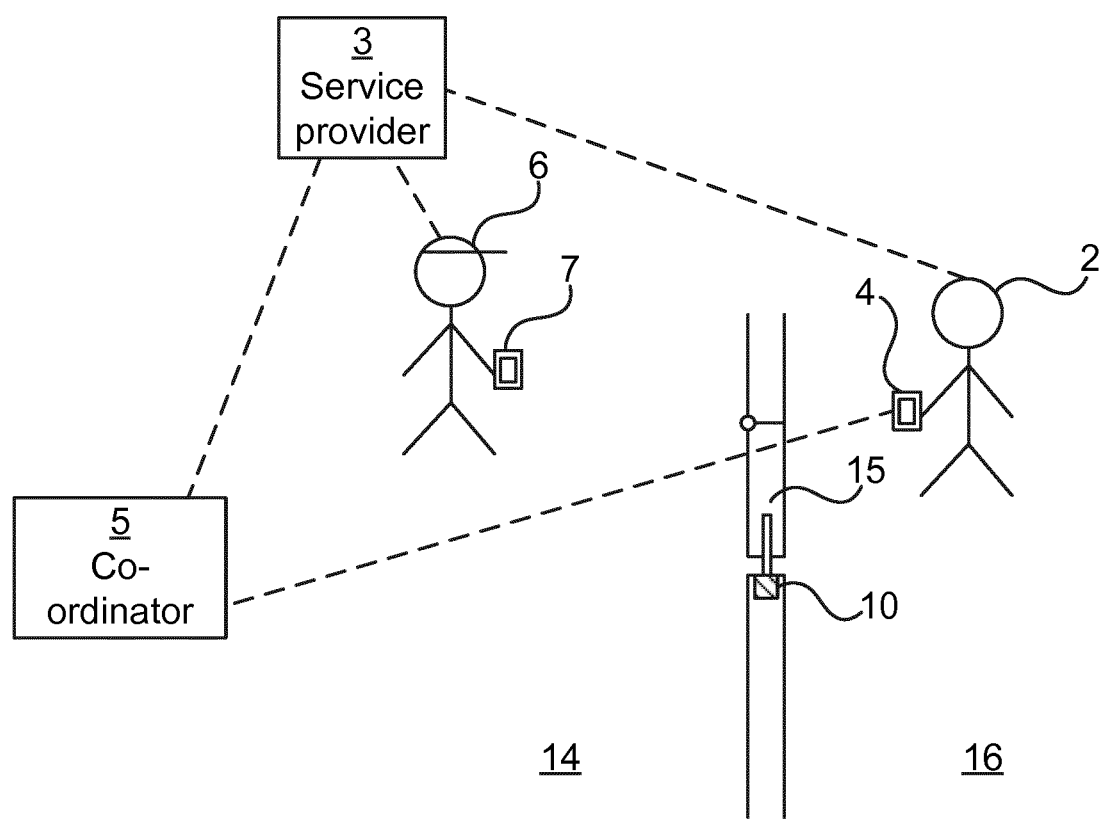
FIG. 1 is a schematic diagram showing an environment in which embodiments presented herein can be applied.

FIG. 1 is a schematic diagram showing an environment in which embodiments presented herein can be applied. Access to a physical space 16 is restricted by a physical barrier 15 which is selectively unlockable. The barrier 15 can be a door, gate, hatch, cabinet door, drawer, window, etc. The physical barrier 15 is provided in a surrounding physical structure (being a wall, fence, ceiling, floor, etc.) and stands between the restricted physical space 16 and an accessible physical space 14. Note that the accessible physical space 14 can be a restricted physical space in itself, but in relation to this physical barrier 15, the accessible physical space 14 is accessible. In order to control the locked or unlocked state of the barrier 15, a lock 10 is provided.

The owner or user of the lock 10 is here denoted a service consumer 2. The service consumer carries a service consumer device 4, which is a portable electronic device, e.g. a smartphone, mobile phone, tablet computer, laptop computer, etc.

The lock 10 is an electronic lock which is capable of communication with the service consumer device 4. The service consumer device 4 can in turn, but does not need to, be connected or connectable to a plurality of similar locks. The service consumer device 1 can configure the lock 10, e.g. by adding and/or removing credentials which should be allowed to have access. This can be configured directly in the lock 10, or by delegating a right to access the lock from a credential in the service consumer device. The lock 10 is an electronic lock and can be opened using a credential which is not mechanical.

For instance, the credential can be an electronic key, and may be implemented as part of a mobile phone, a smartphone, a key fob, wearable device, smart phone case, access card, electronic physical key, etc. The electronic key can communicate with the lock 10 over a wired or wireless interface, e.g. using Bluetooth, Bluetooth Low Energy (BLE), any of the IEEE 802.15 standards, Radio Frequency Identification (RFID), Near Field Communication (NFC).

There is also a service provider server 3, controlled by a service provider. The service provider can e.g. be a delivery company, a cleaning company, a building company, a plumber, an electrician, etc. The service provider server 3 can also be provided by a third party, on behalf of the service provider. This is particularly useful for small businesses who may not want to set up their own service provider server.

As explained in more detail below, the service consumer 2 orders a service from the service provider controlling the service provider server 3.

The service provider uses a service provider agent 6 to conduct the service. The service provider agent 6 can be an employee or a sub-contractor of the service provider. The service provider agent 6 carries a service provider agent device 7, which is a portable electronic device, e.g. a smartphone, mobile phone tablet computer, laptop computer, etc. The functions described herein as being performed by the service provider agent device 7, can e.g. be performed in a software application (also known as app) executing on the service provider agent device. In one embodiment, the service provider agent device 7 can be used to provide an electronic key using a temporary credential, to thereby selectively control the opening of the lock 10.

A co-ordinator 5 is a server which co-ordinates communication between the different parties involved in this scenario of providing a service which needs access to the restricted physical space 16.

Communication between the different nodes in FIG. 1 can occur using local communication, e.g. using Bluetooth, Bluetooth Low Energy (BLE), any of the IEEE 802.15 standards, any of the IEEE 802.11 standards, wireless USB (Universal Serial Bus), USB, Ethernet, serial connection (e.g. RS-485), etc. and/or over wide area communication such as cellular networks and the Internet. On a higher layer, Internet Protocol (IP) could be used for the communication.

Figure 2:
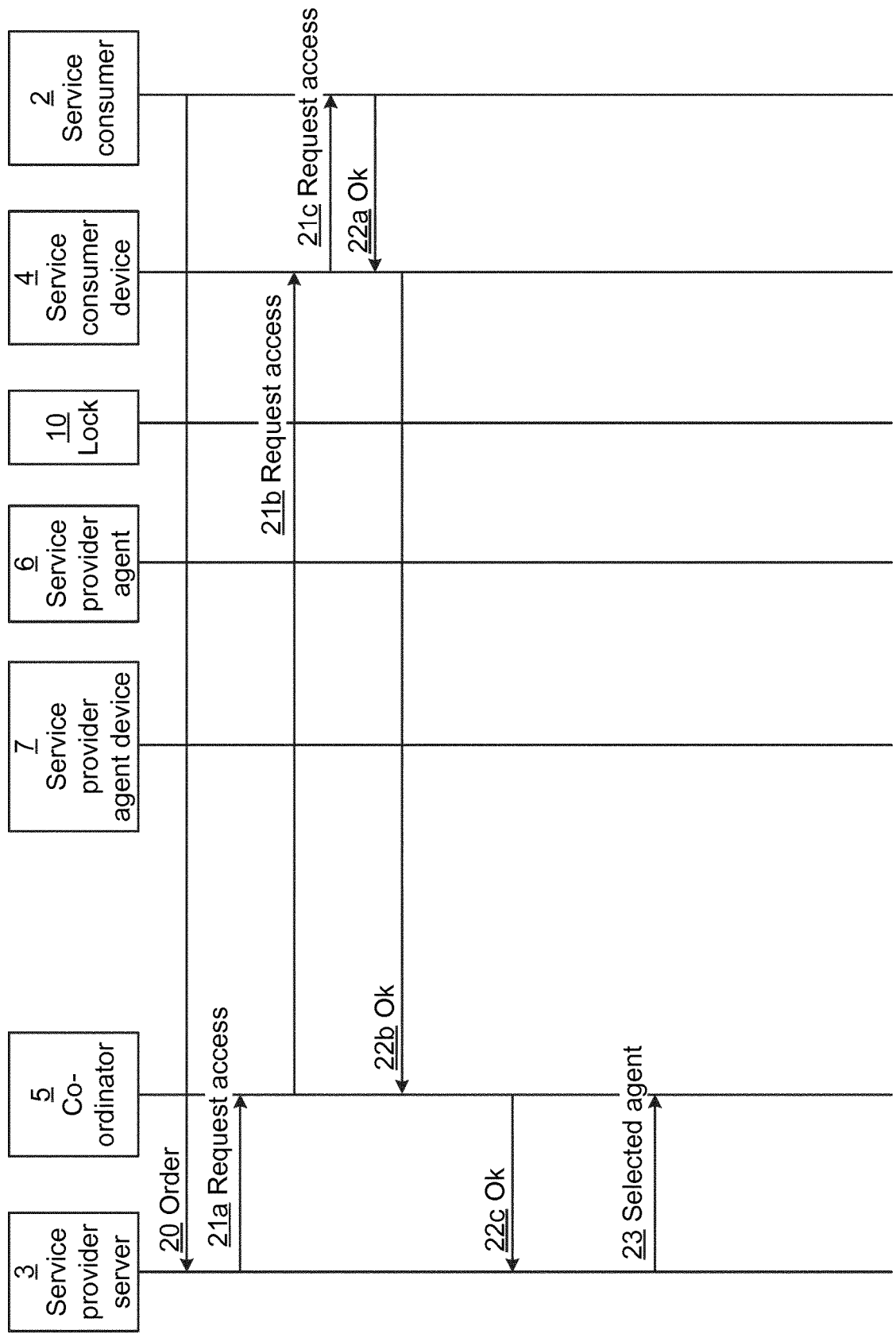
FIG. 2 is a sequence diagram illustrating communication in an example for providing a service in the environment of FIG. 1.
Figure 2:
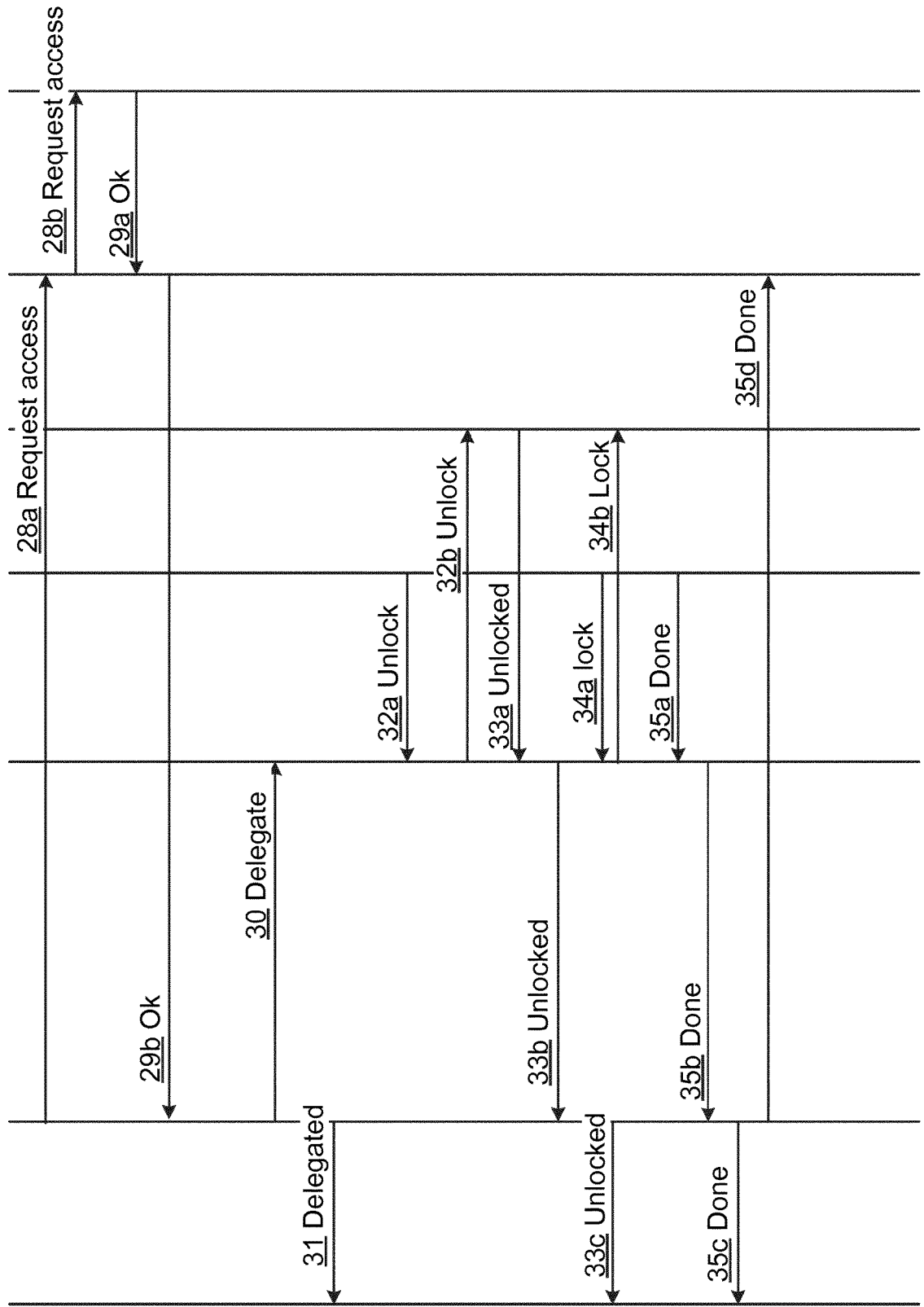

FIG. 2 is a sequence diagram illustrating communication in an example for providing a service in the environment of FIG. 1.

First, the service consumer 2 sends an order 20 for a service to a service provider server 3. The order 20 can be an order over an electronic service, to such as the Internet, over telephone, in person, etc. When the order 20 is not electronic, a person of the service provider enters data of the order into the service provider server 3. It is to be noted that the order 20 can be an indirect order from the service consumer 2 via a third party and does not need to be directly from the service consumer 2 to the service provider server 3. For instance, in an e-commerce example, the service consumer 2 orders a physical product to be delivered from a vendor (being a third party not shown in FIG. 2). The vendor, in turn, makes use of a delivery company for delivery of the physical product to the service consumer 2. The selection of delivery company can be performed by the service consumer or the vendor. In this case, the service consumer 2 indirectly orders a delivery service from the delivery company, in which case the delivery company is the service provider.

The service provider server 3 sends a request 21*a* for access to the co-ordinator. The request 21*a* indicates that the service provider would like access to open the lock of the service consumer. The request 21*a* comprises an identifier (e.g. e-mail address or phone number) of the service consumer 2 (or his/her lock 10) and optionally a proposed time or schedule for providing the service of the order 20. Moreover, the request can comprise a public key of a cryptographic key pair comprising both a public key and a private key. If the service consumer 2 does not support access provision according to the rest of this sequence, this is replied to the service provider server 3 and the sequence ends. Otherwise, the co-ordinator sends a corresponding request 21*b* for access to the service consumer device 4. This request can comprise a public key of the co-ordinator. Optionally, the request also comprises a public key of the service provider. The service consumer device 4 then asks the service consumer 2 in a request 21*c* for access, whether the service provider should be allowed access using the lock 10, optionally also including a suggested time or time window. This can e.g. be provided as a query in a software application (also known as app) of the service consumer device 4.

The service consumer 2 accepts the request (otherwise the sequence ends) in a positive consumer response 22*a*. The service consumer device 4 sends a to corresponding positive consumer response ("ok") 22*b* to the co-ordinator 5. The service consumer device 4 can at this stage generate an electronic delegation of access right for the lock 10, which is included in the positive consumer response 22*b*. The delegation can be based on the public key of the co-ordinator (and optionally also based on the public key of the service provider) received in the request 21*b*. In this way, the service consumer device ensures that only the co-ordinator can further delegate the access right (to a service provider agent device) at a later stage. It is to be noted that as long as the co-ordinator can delegate the access right, it is not necessary that the delegation at this stage also is based on the public key of the service provider. The delegation is verified at the lock by ensuring there is a valid sequence of delegations from the service consumer to the service provider agent device. Each delegation is a delegation of access from a delegator to a delegatee and is provided electronically in a message to the delegatee. Each delegation also includes any preceding delegations. The delegation is signed using an electronic signature by the delegator. In this way, when the service provider agent device provides its delegation to the lock, the lock can verify that there is a valid sequence of delegations from the service consumer to the service provider agent device, by ensuring that the sequence is valid, that the delegator of the first delegation is the service consumer and that the delegatee of the last delegation is the service provider agent device.

The co-ordinator sends a corresponding positive consumer response 22*c* to the service provider server 3, but the delegation does not need to be part of that positive consumer response 22*c*. Instead, the co-ordinator 5 can store the delegation for later use. The service provider now knows that the consumer is ready to accept the delivery of the service (optionally at the suggested time, time window or schedule).

Once the service provider has selected a service provider agent 6 (i.e. physical person) which is to deliver the service, the service provider server 3 transmits a selected agent message 23 to the co-ordinator 5. This does not need to happen immediately and can occur quite some time after the service provider server 3 received the positive consumer response 22*c*.

Optionally, a second service consumer confirmation is now invoked. This can be quite useful, e.g. if the service consumer happens to be home and the service is a package delivery. As explained in more detail below, this can be triggered a certain time before expected delivery of service and/or when the service provider agent 6 is within a configured distance from the lock 10. Using the second consumer confirmation, the service consumer can choose whether to activate the credential or not for the service. When this second service consumer confirmation is performed, the co-ordinator 5 sends a second consumer request 28*a* to the service consumer device 4. The service consumer device 4 again asks the user in a request 28*b* for access, whether the service provider should be allowed access using the lock 10. This can e.g. be provided as a query in an application of the service consumer device 4.

The service consumer 2 accepts this second request in a second positive consumer response 29*a*. Alternatively (not shown) the service consumer 2 rejects the second request, whereby the procedure ends. When accepted, the 25 service consumer device 4 sends a corresponding positive consumer response 29*b* to the co-ordinator 5.

The co-ordinator 5 is now ready to delegate access to the lock 10 further to provide access for the service provider agent 7, by sending a delegation 30 of the access to the service provider agent device 7. Also, the co-ordinator 5 sends an acknowledgement of the delegation 31 to the service provider server 3 to inform that access has been provided to the service provider agent device 7.

Once the service provider agent 6 arrives at the site of the lock 10, the service provider agent 6 provides unlock input 32a to the service provider agent device 7 (e.g. using the user interface). The service provider agent device 7 then unlocks 32b the lock 10 using the delegation received from the co-ordinator (originating from the service consumer device 4). Optionally, the service provider agent device 7 only allows the unlocking if the validity time of the delegation encompasses the current time.

When the lock 10 is unlocked, the lock 10 sends an unlocked message 33a to the service provider agent device 7, which sends a corresponding unlocked message 33b to the co-ordinator 5 which, in turn, sends an unlocked message 33c to the service provider server 3. In this way, the service provider is made aware of the fact that the service provider agent 6 has unlocked the lock 10.

When the service provider agent 6 has performed the ordered service, the service provider agent 6 provides a lock command 34a to the service provider agent device, which sends a corresponding lock message 34b to the lock 10 and indicates that the service is done 35a on the service provider agent device 7, e.g. using its user interface. The service provider agent device 7 sends a corresponding done message 35b to the co-ordinator 5, after which the co-ordinator 5 sends a done message 35c to the service provider server 3 and a done message 35d to the service consumer device 4. The service consumer device 4 can then notify the service consumer 2 that the service has been performed.

Figure 3:
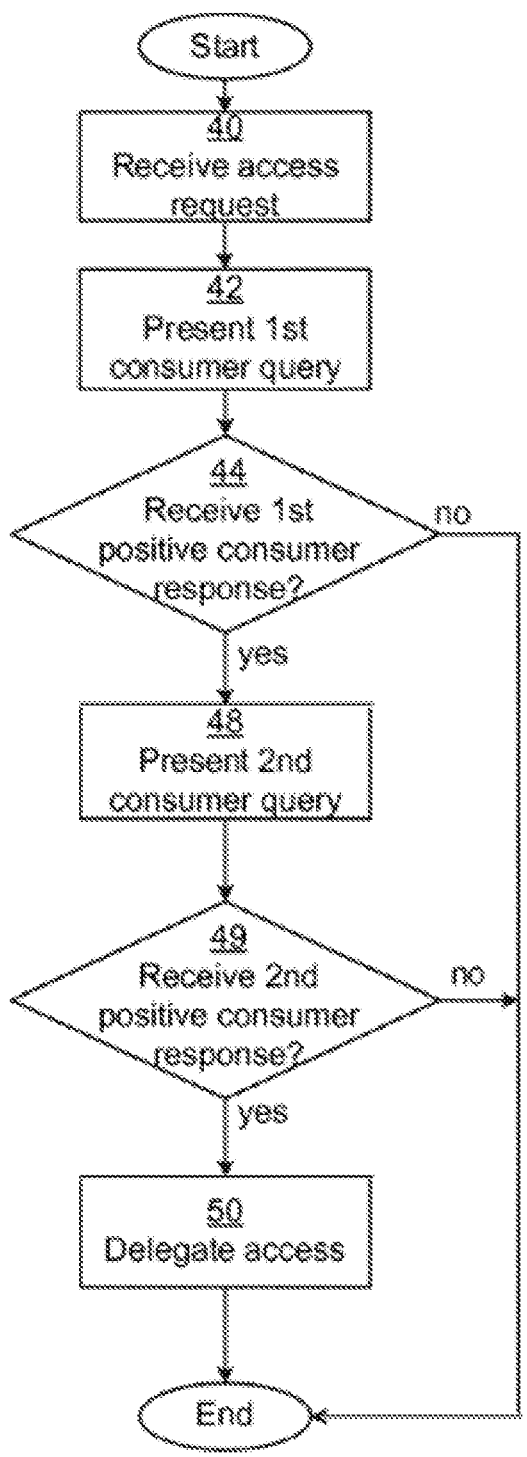
FIG. 3 is a flow chart illustrating embodiments of method for providing access to a lock for provision of a service.

FIG. 3 is a flow chart illustrating embodiments of method for providing access to a lock for provision of a service. As explained above, the lock is associated with a service consumer. The method is performed in the service consumer device 4 and corresponds to the actions of the service consumer device 4 illustrated in FIG. 2 and described above.

In a receive access request step 40, a request for access to the lock is received. The request is based on the service consumer ordering a service requiring access to a physical space which is secured by the lock. The request for access can be received from the co-ordinator 5. The request comprises a first public key associated with a co-ordinator and a second public key associated with a service provider agent.

Hence, the request comprises a first public key of the co-ordinator and the request comprises a second public key of a service provider responsible for appointing the service provider agent.

In a present $1^{st}$ consumer query step 42, a first consumer query is presented to a service consumer, asking whether to grant access to the lock for the service provider agent to provide the service.

In a conditional receive $1^{st}$ positive consumer response step 44, it is determined whether a first positive consumer response is received from the service consumer, wherein the positive consumer response indicates that the service consumer allows the service provider agent to access the physical space secured by the lock. If the first positive consumer response is received, the method proceeds to either an optional present $2^{nd}$ consumer query step 48 or a delegate access step 50. Otherwise, the method ends.

Using this confirmation procedure with the service consumer, the service consumer needs to provide an acceptance that the lock needs to be opened for service provider agent which provides the service. This provides a feedback to the service provider which is then free to prepare the delivery of the service.

In the optional present $2^{nd}$ consumer query step 48, a second consumer query is presented to the service consumer, asking whether to grant access to the lock for the service provider agent to provide the service.

Optionally, the present $2^{nd}$ consumer query step 48 is only performed at a configured time prior to when access to a lock for the service provider agent is needed. Additionally or optionally, the present $2^{nd}$ consumer query step 48 is only performed when a signal is received indicating that the service provider agent is within a configured distance from the lock. For instance, this step can be triggered when, within the validity time of the temporary credential, the service provider agent is with a certain distance of the lock 10.

In an optional conditional receive $2^{nd}$ positive consumer response step 49, it is determined whether a second positive response is received from the service consumer, indicating that the service consumer allows the service provider agent to access the physical space secured by the lock. If this is the case, the to method proceeds to the delegate access step 50. Otherwise, the method ends.

In this way, the service consumer is given the option of either accepting or rejecting that the temporary credential is activated. For instance, if the service is intended to be performed at home and the service consumer happens to at home the service consumer can choose to open the door himself/herself, whereby the temporary credential is never activated in the lock 10.

When there is an absence of response to the second consumer query, this is configurable to imply either that the service consumer rejects access or that the service consumer accepts access for the service provider agent.

In the delegate access step 50, access to the lock is delegated to the co-ordinator. This comprises encrypting at least part of a delegation using the first public key and encrypting at least part of the delegation using the second public key. Also, the service consumer device electronically signs the delegation. The delegated access enables further delegation, of access of the lock, to the service provider agent, which is enforced by the lock as described above with reference to the sequence of delegations.

In other words, this step comprises generating the delegation based on the first public key and the second public key. For instance, a section of the delegation can be encrypted using the first public key, allowing only the co-ordinator to decrypt that section. Analogously, a section of the delegation can be encrypted using the second public key, allowing only the service provide to decrypt that section. In this way, even when access is delegated to the co-ordinator for further delegation to the service provider agent, data to the service provider agent is securely relayed by the co-ordinator using the delegation procedure.

For recurring services by the service provider agent, such as a weekly cleaning, the method is repeated except for the steps of presenting a first consumer query and receiving a first positive consumer response.

Figure 4:
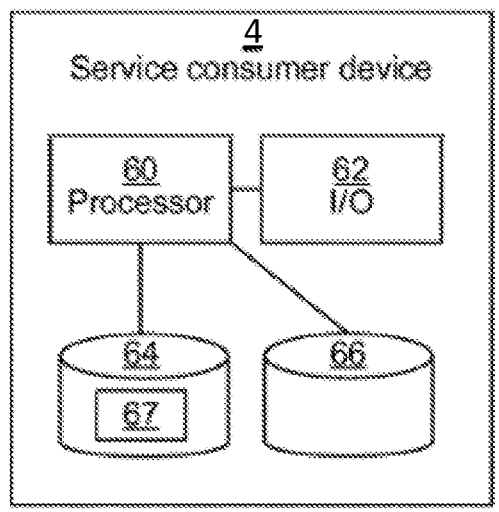
FIG. 4 is a schematic diagram illustrating components of the service consumer device of FIG. 1.

FIG. 4 is a schematic diagram illustrating components of the service consumer device 4 of FIG. 1. A processor 6o is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIG. 3 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The service consumer device 4 further comprises an I/O interface 62 for communicating with other external entities, such as the lock 10, the co-ordinator and the service consumer device. The I/O interface 62 can comprise components communication over any one or more of any of the IEEE 802.11 standards, wireless USB (Universal Serial Bus), USB, Ethernet, serial connection (e.g. RS-485), Bluetooth, Bluetooth Low Energy (BLE), any of the IEEE 802.15 standards, Radio Frequency Identification (RFID), Near Field Communication (NFC), etc.

Other components of the service consumer device 4 are omitted in order not to obscure the concepts presented herein.

Figure 5:
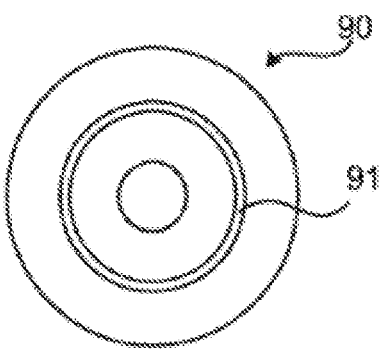
FIG. 5 shows one example of a computer program product comprising computer readable means.

FIG. 5 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for providing access to a lock for provision of a service, the lock being associated with a service consumer, the method being performed in a service consumer device and comprising the steps of:
   receiving a request for access to the lock, the request being based on the service consumer ordering a service requiring access to a physical space which is secured by the lock, the request comprising a first public key associated with a co-ordinator and a second public key associated with a service provider agent, being a person used by a service provider conduct the service;
   presenting a first consumer query to the service consumer, asking whether to grant access to the lock for the service provider agent to provide the service;
   receiving a first positive consumer response indicating that the service consumer allows the service provider agent to access the physical space secured by the lock;
   presenting a second consumer query to the service consumer, asking whether to grant access to the lock for the service provider agent to provide the service, wherein the step of presenting a second consumer request is only performed at a configured time prior to when access to the lock for the service provider agent is needed;
   receiving a second positive response, indicating that the service consumer allows the service provider agent to access the physical space secured by the lock; and
   delegating access to the lock to the co-ordinator, which comprises encrypting at least part of a delegation using the first public key, encrypting at least part of the delegation using the second public key, and electronically signing the delegation, enabling further delegation, of access of the lock, to the service provider agent, wherein the step of delegating access only performed when the second positive response has been received.

2. The method according to claim 1, wherein the step of delegating access comprises delegating access for a scheduled time only.

3. The method according to claim 1, wherein when there is an absence of response to the second consumer request, the step of delegating access is still performed.

4. The method according to claim 1, wherein when there is an absence of response to the second consumer request, the step of delegating access is prevented from being performed.

5. The method according to claim 1, wherein the step of sending a second consumer request is only performed when a signal is received indicating that the service provider agent is within a configured distance from the lock.

6. The method according to claim 1, wherein for recurring services by the service provider agent, the method is repeated except for the steps of presenting a first consumer query and receiving a first positive consumer response.

7. A service consumer device for providing access to a lock for provision of a service, the lock being associated with a service consumer, the service consumer device comprising:
   a processor; and
   a memory storing instructions that, when executed by the processor, cause the service consumer device to:
   receive a request for access to the lock, the request being based on the service consumer ordering a service requiring access to a physical space which is secured by the lock, the request comprising a first public key associated with a co-ordinator and a second public key associated with a service provider agent, being a person used by a service provider conduct the service;
   present a first consumer query to the service consumer, asking whether to grant access to the lock for the service provider agent to provide the service;
   receive a first positive consumer response indicating that the service consumer allows the service provider agent to access the physical space secured by the lock;
   present a second consumer query to the service consumer, asking whether to grant access to the lock for the service provider agent to provide the service, wherein the instructions to present a second consumer request are only executed at a configured time prior to when access to the lock for the service provider agent is needed;
   receive a second positive response, indicating that the service consumer allows the service provider agent to access the physical space secured by the lock;
   delegate access to the lock to the co-ordinator, which comprises encrypting at least part of a delegation using the first public key, encrypting at least part of the delegation using the second public key, and electronically signing the delegation, enabling further delegation, of access of the lock, to the service provider agent; and only execute the instructions to delegate access when the second positive response has been received.

8. The service consumer device according to claim 7, wherein the instructions to delegate access comprise instructions that, when executed by the processor, cause the service consumer device to delegate access for a scheduled time only.

9. A non-transitory computer-readable medium comprising a computer program stored thereon configured to provide access to a lock for provision of a service, the lock being associated with a service consumer, the computer program comprising computer program code which, when run on a service consumer device causes the service consumer device to:

receive a request for access to the lock, the request being based on the service consumer ordering a service requiring access to a physical space which is secured by the lock, the request comprising a first public key associated with a co-ordinator and a second public key associated with a service provider agent, being a person used by a service provider conduct the service;

present a first consumer query to the service consumer, asking whether to grant access to the lock for the service provider agent to provide the service;

receive a first positive consumer response indicating that the service consumer allows the service provider agent to access the physical space secured by the lock;

present a second consumer query to the service consumer, asking whether to grant access to the lock for the service provider agent to provide the service, wherein the computer program code causing the service consumer device to present a second consumer request is only run at a configured time prior to when access to the lock for the service provider agent is needed;

receive a second positive response, indicating that the service consumer allows the service provider agent to access the physical space secured by the lock;

delegate access to the lock to the co-ordinator, which comprises encrypting at least part of a delegation using the first public key, encrypting at least part of the delegation using the second public key, and electronically signing the delegation, enabling further delegation, of access of the lock, to the service provider agent; and only run computer program code causing the service consumer device to delegate access when the second positive response has been received.

* * * * *